United States Patent [19]

Ding

[11] Patent Number: 5,606,765
[45] Date of Patent: Mar. 4, 1997

[54] WINDSHIELD WIPER CONNECTOR FOR ACCOMMODATING DIFFERENT HOOK-TYPE WIPER ARMS

[75] Inventor: You Ding, Miami, Fla.

[73] Assignee: Rally Accessories, Inc., Miami, Fla.

[21] Appl. No.: 523,166

[22] Filed: Sep. 5, 1995

Related U.S. Application Data

[63] Continuation of Ser. No. 305,667, Sep. 14, 1994, abandoned.

[51] Int. Cl.$^6$ ...................................................... B60S 1/40
[52] U.S. Cl. .......................... 15/250.32; 403/329; 403/24
[58] Field of Search ........................... 15/250.32, 250.31, 15/250.41, 250.42, 250.33, 250.35, 250.36; 403/24, 119, 326, 329

[56] References Cited

U.S. PATENT DOCUMENTS

| | | | |
|---|---|---|---|
| 3,425,089 | 2/1969 | Quinlan et al. | 15/250.32 |
| 3,780,395 | 12/1973 | Quinlan et al. | 15/250.365 |
| 3,919,735 | 11/1975 | Arman | 15/250.32 |
| 4,214,343 | 7/1980 | Dudek | 15/250.32 |
| 4,866,812 | 9/1989 | Arai | 15/250.32 |
| 5,168,597 | 12/1992 | Schon et al. | 15/250.32 |
| 5,289,608 | 3/1994 | Kim | 15/250.32 |

FOREIGN PATENT DOCUMENTS

| | | | |
|---|---|---|---|
| 598653 | 5/1994 | European Pat. Off. | 15/250.32 |
| 2501135 | 9/1982 | France | 15/250.32 |
| 2507555 | 12/1982 | France | 15/250.32 |
| 2631300 | 11/1989 | France | 15/250.32 |
| 3208235 | 9/1983 | Germany | 15/250.32 |
| 3608936 | 5/1987 | Germany | 15/250.32 |
| 3619589 | 12/1987 | Germany | 15/250.32 |
| 2421378 | 12/1994 | Germany | 15/250.32 |
| 2034580 | 6/1980 | United Kingdom | 15/250.32 |

*Primary Examiner*—Gary K. Graham
*Attorney, Agent, or Firm*—Longacre & White

[57] ABSTRACT

A windshield wiper frame connector for windshield wipers comprising an arrangement for receiving multiple hook-type wiper arms; thereby improving on the versatility and interchangeability of the wiper blades.

6 Claims, 3 Drawing Sheets

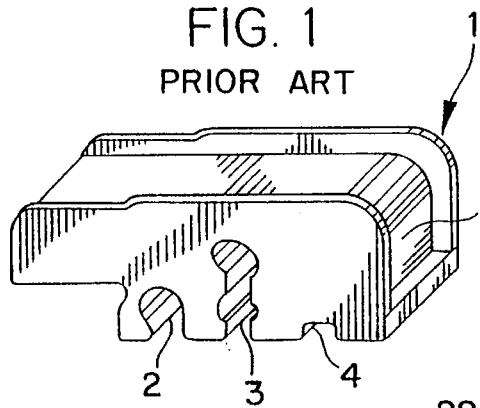
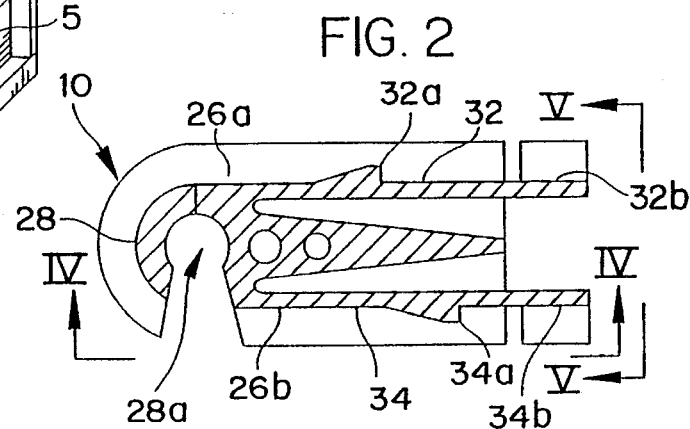
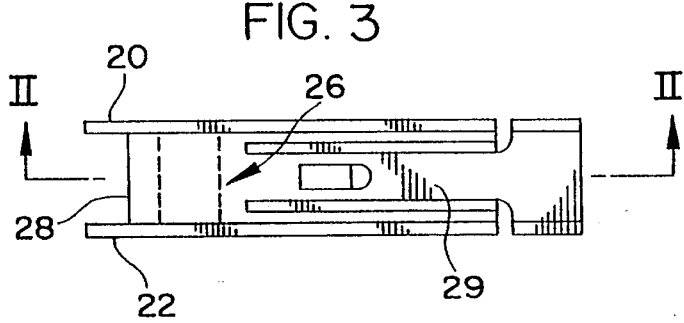
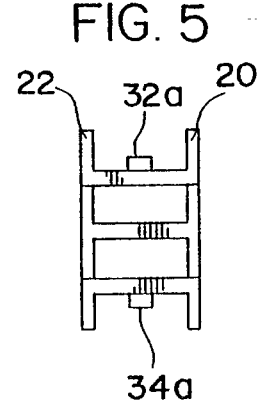
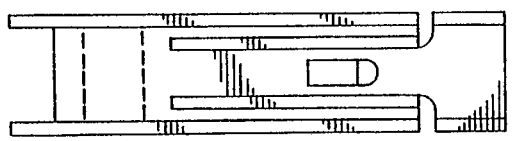

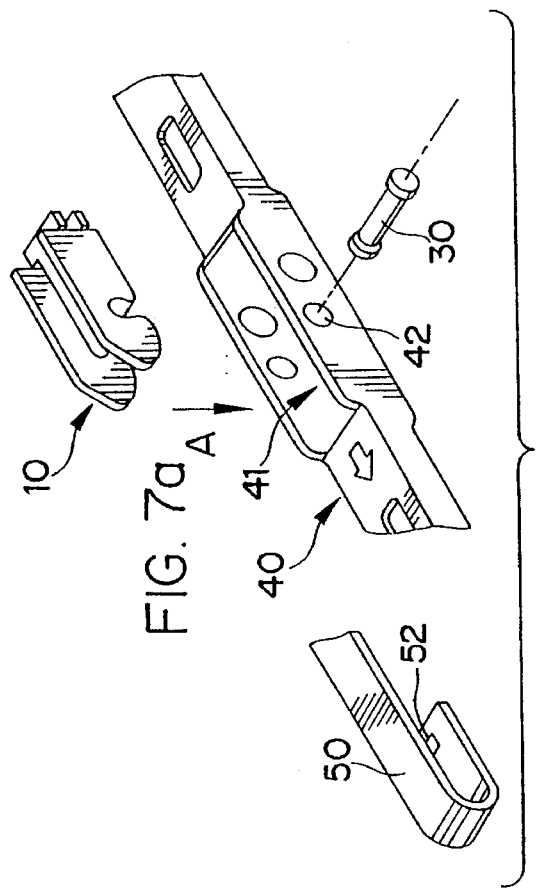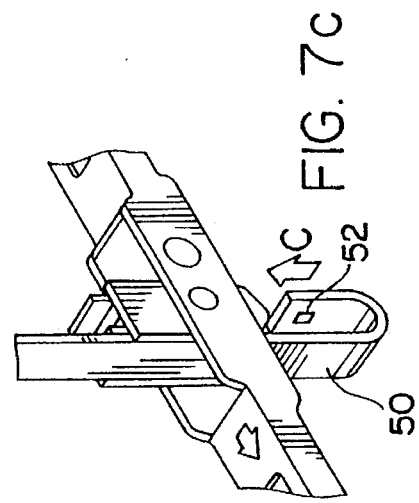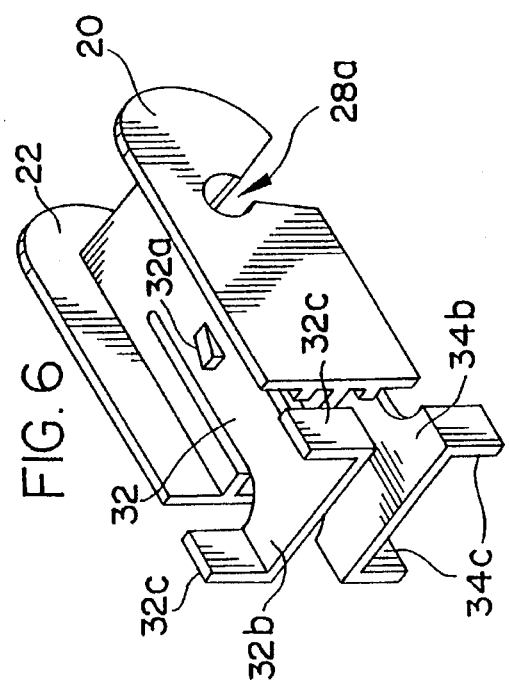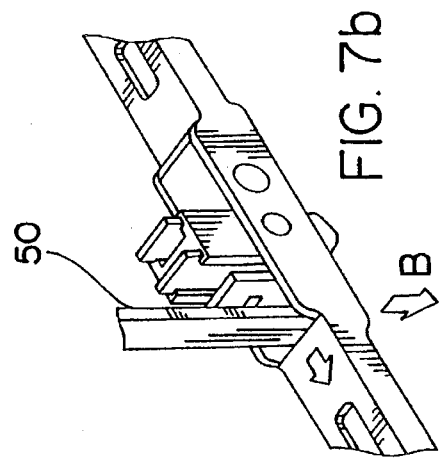

5,606,765

WINDSHIELD WIPER CONNECTOR FOR ACCOMMODATING DIFFERENT HOOK-TYPE WIPER ARMS

This is a continuation of application Ser. No. 08/305,667, filed Sept. 14, 1994, which was abandoned upon the filing hereof.

BACKGROUND OF THE INVENTION

1. Field of the Invention

The present invention related generally to the construction of a windshield wiper frame connector and more particularly, to an improved wiper arm and blade unit connector for windshield wipers, comprising an arrangement for receiving multiple hook-type wiper arms; thereby improving on the versatility and interchangeability of the wiper blades.

2. Description of the Prior Art

Various types of windshield wiper arm and blade unit connectors for a windshield wiper assembly are well known. Such windshield wiper frames connectors include a pair of apertured ears pivotally connected to a pin of the pin type arm as shown in U.S. Pat. No. 3,425,089 to Quinlan and U.S. Pat. No. 3,780,395 to Quinlan et al. However, such prior art wiper frame connectors are costly to manufacture and difficult to assemble with the wiper arm and the blade unit due to their complicated structure. Furthermore, such prior art connectors are incapable of receiving the widely used hook type arm of the windshield wiper assembly which restricts their use in many applicable circumstances.

Conventionally, windshield wiper frame connector 1 as shown in prior art FIG. 1 is equipped with first, second, and third slots 2, 3, and 4 and an L-shaped recess 5 for receiving both the hook type arm and the pin type arm. However, the windshield wiper frame connector 1 suffers from a number of problems. For example, the prior art assembly lacks any locking members that would securely lock the hook type arm to the wiper frame connector. Moreover, the connector is not able to receive more than one type of hook arm. These characteristics and above stated problems are disadvantages in achieving and efficient and economical windshield wiper assembly.

SUMMARY OF THE INVENTION

Accordingly, it is an object of the present invention to provide an improved windshield wiper frame connector for use in a windshield wiper assembly for motor vehicles.

Another object is to provide an improved connector separately connected to a wiper arm and a blade unit for a windshield wiper assembly.

Another object of the invention is to provide an improved connector adapted to receive both an upward oriented hook arm and a downward oriented hook arm to improve upon the versatility of the connector assembly.

Other objects and further scope of applicability of the present invention will become apparent from the detailed description given hereafter. It should be understood, however, that the detailed description and specific example while indicating a preferred embodiment of the invention, is given by way of illustration only, since various changes and modifications within the spirit and scope of the invention will become apparent to those skilled in the art from this detailed description.

BRIEF DESCRIPTION OF THE DRAWINGS

FIG. 1 is a conventional wiper arm connector;

FIG. 2 is a cross-sectional view of the wiper arm adapter of the invention taken along section line II—II of FIG. 3;

FIG. 3 is a top view of the wiper arm adapter of the invention;

FIG. 4 is a bottom view of the wiper arm adapter of FIG. 2 as viewed along line IV—IV of FIG. 2;

FIG. 5 is a side view of the wiper arm adapter of FIG. 2 as viewed along line V—V of FIG. 2;

FIG. 6 is a perspective view of the adapter of the invention;

FIGS. 7a–7c are perspective views illustrating the assembly procedure for a downwardly projecting wiper arm and wiper blade using the adapter of the invention.

DETAILED DESCRIPTION OF THE PREFERRED EMBODIMENT

Figure 8A:
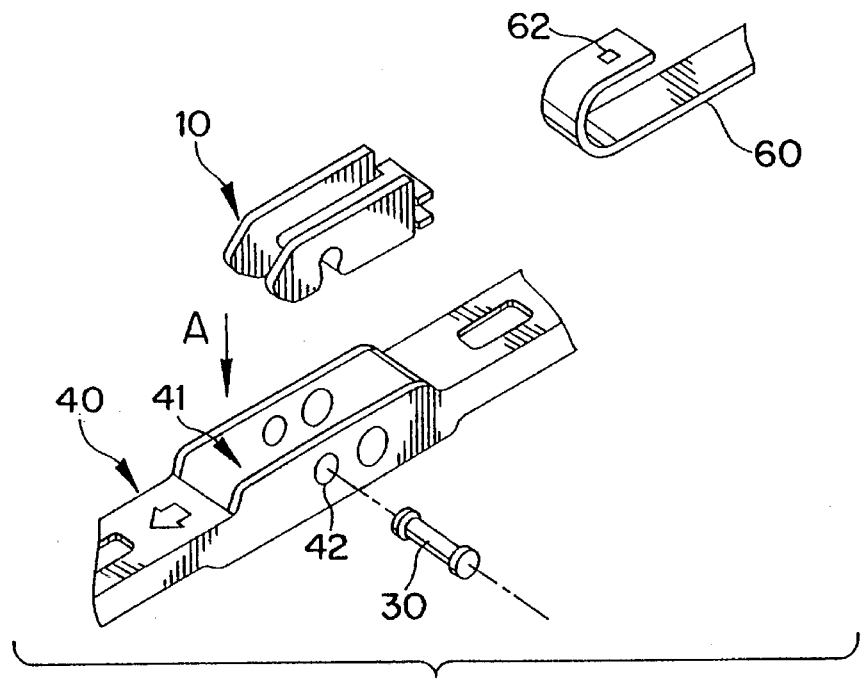
FIGS. 8a and 8b are perspective views illustrating the assembly procedure for an upwardly projecting wiper arm and wiper blade using the adapter of the invention.

An adapter according to the invention will now be described with reference to the accompanying drawing figures.

With reference to FIGS. 2–6, the adapter 10 comprises an elongated main body integrally formed from two opposed side wall members 20, 22. The opposed side walls 20, 22 are integrally connected by a multi-hook receiving section 26.

The multi-hook receiving section 26 is comprises a rounded front end 28 and a securing portion 29 opposite the rounded front end 28. The rounded front end 28 is molded with a passageway 28a formed to receive a rivet provided on the wiper bridge member. The passageway is formed to securely snap onto the rivet to secure the adapter 10 to the wiper blade assembly as will be discussed below.

The multi-hook receiving section 26 is formed to accommodate different sized hook-type wiper arms. Specifically, the multi-hook receiving section 26 is formed to receive both a first hook-type wiper arm which wraps around from the top portion 26a of the section 26, and a second hook-type wiper arm which wraps around from the bottom portion 26b of the section 26.

The securing portion 29 is formed of cantilevered arms members 32, 34 which respectively extend from the top portion 26a, and the bottom portion 26b in a direction opposite the rounded font end 28. Each cantilevered arm member 32, 34 is formed with a tang or projection 32a, 34a sized to engage the respective hook sections of the hook-type wiper arms. Because the projections 32a, 34a are formed on the cantilevered arms 32, 34 the projections may be disengaged from the hook sections by depressing the ends 32b, 34b of the arms 32, 34. Once the hook 50 has been assembled, substantially all of the cantilevered arms 32 and 34 are covered by the hook. To facilitate disengagement of the projections 32a and 34a from the aperture 52 of the hook 50, the arms 32, 34 are formed with expanded end sections 32b and 34b which define a width greater than the width of hook 50. In the preferred embodiment, a pair of spaced apart opposing extending walls 32c and 34c may be mounted extending outward from ends 32b and 34b positioned adjacent to and co-planar to the opposed side walls 20 and 22. The extending walls 32c and 34c afford an accessible surface which may simply be pressed by a person's fingers to cause the cantilevered arms 32, and 34 to bend inward thus disengaging the projections 32a and 34a from the aperture 52 of hook 50.

The procedure for assembling the wiper blade to a hook-type wiper arm in accordance with the invention will now be described with reference to FIGS. 7a–7c. As seen in FIG. 7a, a short metal pin or rivet 30 is first inserted into a hole 42 provided on the wiper bridge section 41 of the wiper blade 40. The adapter 10 is then snap-fitted onto the rivet 30 by moving the adapter in the direction of arrow A until it locks with the rivet 30. At this point, the adapter 10 is partially received within the rectangular opening provided in the wiper bridge section 41.

With reference to FIG. 7b, the adapter 10 is next rotated into the upward position shown in FIG. 7b, and the hook arm 50 is inserted (in the direction of arrow B) into the gap formed in the rectangular opening between the top portion 26a of adapter 10 and the walls of the bridge section 41.

The hook arm 50 is then engaged with the adapter 10, and pulled in the direction of arrow C until it locks firmly onto the adapter 10. The hook arm 50 locks to the adapter 10 by means of the projection 34a provided on the adapter 10 (see FIGS. 2–5), and the aperture 52 formed in the hook arm 50. The aperture 52 is sized to receive the projection 34a, and the projection 34a is resiliently maintained in place by the cantilevered arm member 34.

In order to release the hook arm 50 from the adapter 10, the adapter 10 is again rotated to the position illustrated by FIG. 7b. The cantilevered arm member 34 is depressed in order to disengage the projection 34a from the aperture 52. The insertion steps of FIGS. 7b and 7c are then reversed and the hook arm is removed from the wiper arm 40.

Figure 8B:
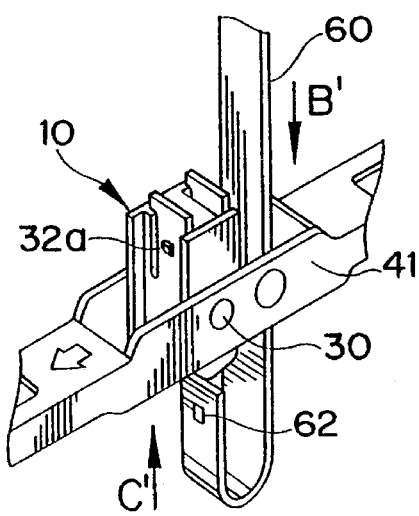

The novelty of the invention resides in the arrangement of the adapter 10 whereby more than one hook-type wiper arm may be affixed to the adapter 10, and thus to the wiper arm of the vehicle. FIGS. 8a and 8b illustrate the installation of a second hook-type wiper arm 60 using the adapter illustrated in FIGS. 2–7c. As opposed to the downwardly projection hook arm 50 of FIGS. 7a–7c, the hook arm 60 illustrated in FIGS. 8a and 8b comprises an upwardly projecting hook arrangement.

The procedure for assembling the wiper blade to the upwardly projecting hook-type wiper arm 60 in accordance with FIGS. 8a, 8b is substantially the same as the procedure described above with reference to FIGS. 7a–7c; however, the hook arm 60 is inserted (in the direction of arrow B') into the gap formed in the rectangular opening between the bottom portion 26b of adapter 10 and the walls of the bridge section 41.

The hook arm 60 is then engaged with the adapter 10, and pulled in the direction of arrow C' until it locks firmly onto the adapter 10. The hook arm 60 locks to the adapter 10 by means of the projection 32a provided on the adapter 10 (see FIGS. 2–5), and the aperture 62 formed in the hook arm 60. The aperture 62 is sized to receive the projection 32a, and the projection 32a is resiliently maintained in place by the cantilevered arm member 32.

In order to release the hook arm 60 from the adapter 10, the adapter 10 is rotated to the position illustrated by FIG. 8b. The cantilevered arm member 32 is then depressed in order to disengage the projection 32a from the aperture 62. The insertion steps of FIGS. 8a and 8b are then reversed and the hook arm is removed from the wiper arm 40.

It is understood that the projections 32a, 34a provided on the adapter 10 are sized and positioned to correspond to a hook arm of suitable dimensions to surely fasten and support the wiper blade assembly. It is noted that various changes may be made to the specific embodiments illustrated in the attached drawings without departing from the spirit and scope of the invention.

What is claimed is:

1. A windshield wiper frame connector for connecting a wiper blade unit to a wiper arm, said connector comprising:

an elongate body member having a front end and rear end extending in a longitudinal direction, and having a pair of spaced opposing sidewalls, each of said side walls defining an inner and outer surface, said inner surfaces facing one another and said outer surfaces defining a transverse width, and a cross-member, formed between and connecting said pair of sidewalls, said cross member extending in a transverse direction and defining an upper surface and a lower surface opposite said upper surface;

a slot disposed in a lower portion of said front end of said elongated body for rotatably receiving a transverse pin of a wiper blade unit, said slot extending downward perpendicular to said longitudinal direction;

an upper cantilevered arm, a lower cantilevered arm, said upper cantilevered arm disposed between said spaced opposing sidewalls, extending rearward from said front portion of said elongated body, for securing said connector to a first hook arm, said upper cantilevered arm having;

an upper rear portion extending beyond said elongate body flaring outward to a first flared width substantially equal to the transverse width of the elongated body; and a first projection extending upward adapted to be received in a first aperture formed on said first hook arm;

said lower cantilevered arm, disposed between said spaced opposing sidewalls, extending rearward from said front portion of said elongate body, for alternatively securing said connector to a second hook arm, said lower cantilevered arm having;

a lower rear portion extending beyond said elongate body flaring outward to a second flared width substantially equal to the transverse width of said elongated body; and a second projection extending downward adapted to be received in a second aperture formed on said second hook arm, wherein said upper cantilevered arm and said lower cantilevered arm extend rearward substantially the same distance from said front portion such that said upper cantilevered arm and said upper rear portion substantially mirror said lower cantilevered arm and said lower rear portion with respect to a longitudinally extending plane disposed between said upper cantilevered arm and said lower cantilevered arm.

2. The windshield wiper frame connector as described in claim 1, wherein said first projection is offset in said longitudinal direction with respect to said second projection whereby, said connector is adapted to alternatively receive said first and second hook arms having apertures offset in said longitudinal direction.

3. The windshield wiper frame connector as described in claim 1, wherein said upper rear portion of said upper cantilevered arm comprises;

a pair of upwardly extending walls integrally formed on said upper rear portion, each wall of said pair corresponding to one of each of said spaced opposing sidewalls lying adjacent and co-planar thereto.

4. The windshield wiper frame connector as described in claim 1, wherein said lower rear portion of said lower cantilevered arm comprises;

a pair of downwardly extending walls integrally formed on said lower rear portion, each wall of said pair corresponding to one of each of said spaced opposing sidewalls lying adjacent and co-planar thereto.

5. The windshield wiper frame connector as described in claim 1, wherein;

said lower cantilevered arm comprises;

a first pair of downwardly extending walls spaced apart lying adjacent to and co-planar to said spaced opposing sidewalls; and said upper cantilevered arm comprises;

a second pair of upwardly extending walls spaced apart lying adjacent to and co-planar to said spaced opposing sidewalls.

6. A windshield wiper frame connector for connecting a wiper blade unit to a wiper arm, said connector comprising:

an elongate body member having a front end and rear end extending in a longitudinal direction, and having a pair of spaced opposing sidewalls, each of said side walls defining an inner and outer surface, said inner surfaces facing one another and said outer surfaces defining a transverse width, and a cross-member formed between and connecting said pair of sidewalls, said cross member extending in a transverse direction and defining an upper surface and a lower surface opposite said upper surface;

a slot disposed in a lower portion of said front end of said elongated body for rotatably receiving a transverse pin of a wiper blade unit;

an upper cantilevered arm, a lower cantilevered arm, said upper cantilevered arm, disposed between said spaced opposing sidewalls, extending rearward from said front portion of said elongated body, for securing said connector to a first hook arm of said cantilevered arm having;

a first projection extending upward adapted to be received in a first aperture formed on said first hook arm;

an upper rear portion extending beyond said elongate body flaring outward to a first flared width substantially equal to the transverse width of the elongated body, said upper rear portion defining an upper access surface which extends beyond a width of said first hook arm; and a pair of upwardly extending walls integrally formed on said upper rear portion, each wall of said pair corresponding to one of each said spaced opposing sidewalls lying adjacent and co-planar thereto;

said lower cantilevered arm, disposed between said spaced opposing sidewalls, extending rearward from said front portion of said elongate body, for alternatively securing said connector to a second hook arm, said lower cantilevered arm having;

a second projection extending downward adapted to be received in a second aperture formed on said second hook arm; and a lower rear portion extending beyond said elongate body flaring outward to a second flared width substantially equal to the transverse width of said elongated body, said lower rear portion defining a lower access surface which extends beyond a width of said second hook arm;

a pair of downwardly extending walls integrally formed on said lower rear portion, each wall of said pair corresponding to one of each of said spaced opposing sidewalls lying adjacent and co-planar thereto;

wherein said first projection is offset in said longitudinal direction with respect to said second projection whereby, said connector is adapted to alternatively receive said first and second hook arms having apertures offset in said longitudinal direction, said pair of upwardly extending walls and said pair of downwardly extending walls are positioned substantially the same distance from said front end in said longitudinal direction such that said pair of upwardly extending walls mirror said pair of downwardly extending walls with respect to a longitudinally extending plane disposed between said upper cantilevered arm and said lower cantilevered arm.

\* \* \* \* \*